Nov. 9, 1965  J. T. ROOS  3,216,576
HORIZONTAL FILTER STRUCTURE

Filed May 15, 1962  4 Sheets-Sheet 1

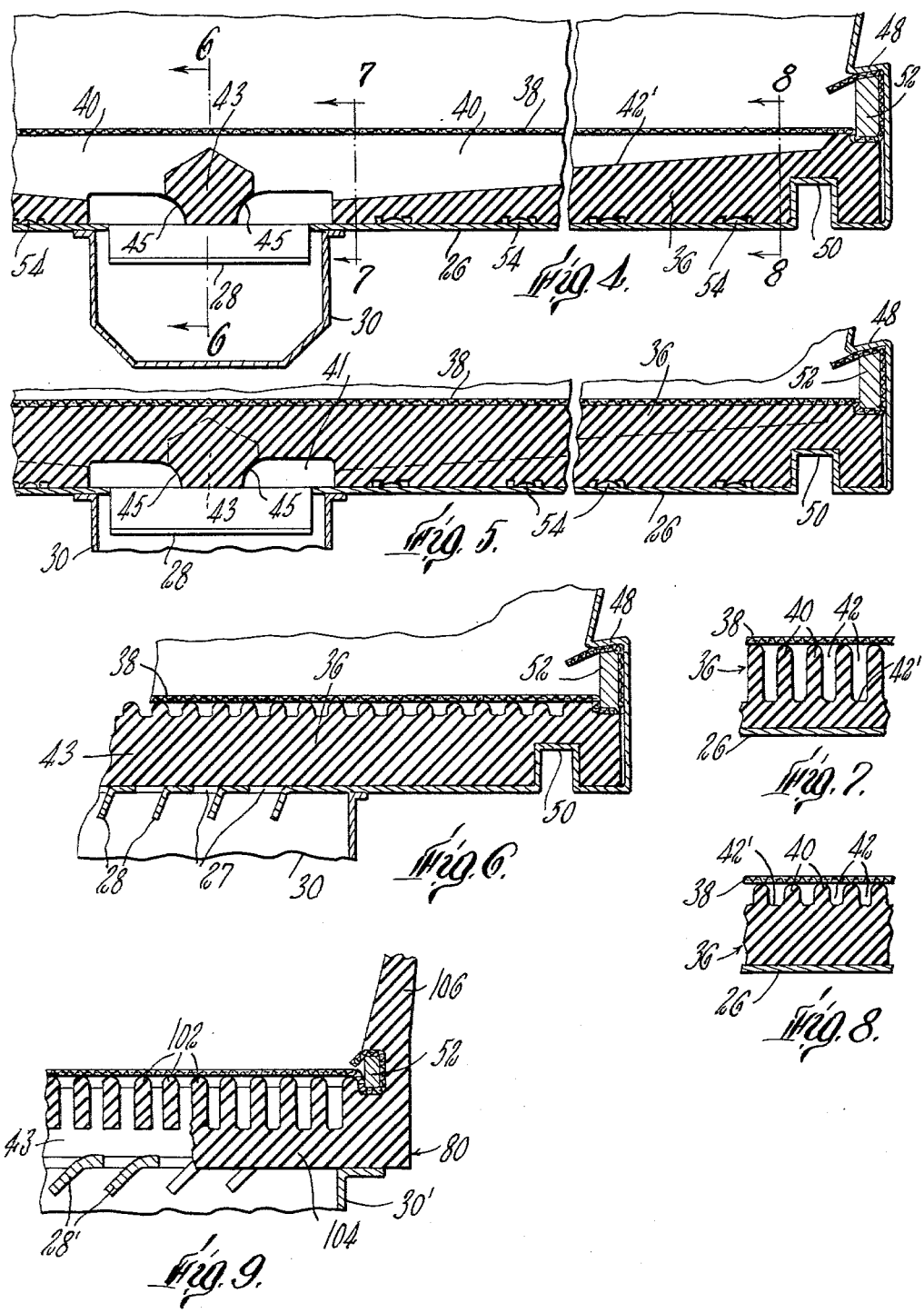

Nov. 9, 1965   J. T. ROOS   3,216,576
HORIZONTAL FILTER STRUCTURE

Filed May 15, 1962   4 Sheets-Sheet 3

Nov. 9, 1965  J. T. ROOS  3,216,576
HORIZONTAL FILTER STRUCTURE
Filed May 15, 1962  4 Sheets-Sheet 4

3,216,576
HORIZONTAL FILTER STRUCTURE
John T. Roos, Westwood, Mass., assignor to Bird Machine Company, South Walpole, Mass., a corporation of Massachusetts
Filed May 15, 1962, Ser. No. 198,393
6 Claims. (Cl. 210—328)

This is a continuation-in-part of my copending application Serial No. 111,284, filed May 19, 1961, now abandoned.

This invention relates to filtering apparatus of the type which has a large horizontal area of sheet-form filter medium for use in such chemical processes as production of phosphoric acid and treatment of metal ores.

In this type of filter a receiver is disposed below the filter medium to receive the filtrate. Vacuum is applied to the receiver and the upper surface of the filter medium is exposed to the atmosphere. Charges of slurry are periodically applied to the upper surface of the horizontal medium, gravity and the pressure of the atmosphere cause the filtrate to pass through the medium and solids which deposit on the upper surface are periodically air dried and then removed either by inverting the filter or by scraping. Inevitably, some solids pass through the filter medium, mostly in the initial surge of each cycle which occurs at the time the charge is applied to the filter medium. These solids tend to deposit in the receiver, and prevent uniform and efficient movement of the filtrate. To avoid this, it has been necessary in the prior art frequently to stop the filtering process and dismantle and clean the receivers.

One of the principal objectives of the invention is to provide an improved receiver which is substantially self-cleansing of solids, which thus achieves optimum flow conditions over an extended period.

Certain prior art structures have employed large volume receiver cavities whose walls had to be reinforced to withstand cave-in forces which occur when vacuum is applied to the receiver. Some receivers have had conically shaped sloped bottoms for causing liquid to flow to circular drains. Other structures have had false bottom members to support the filter medium over the receiver. Each of these features is objectionable as being unduly expensive to provide or inefficient and another objective of the invention is to provide a filter apparatus which does not require these features.

Yet another objective is to provide prompt and complete removal of filtrate from wide area filtrate receivers without the need of an extreme slope to the bottom of the receiver, or of tilting the receiver, which otherwise would be required; and to provide efficient use of differential pressure between the atmosphere and the outlet to promote a substantial cleansing velocity of liquid and air through all parts of the filter for the liquid draining and air drying stages of the filtering cycle.

Still other objectives of the invention include providing filtrate receivers of efficient and inexpensive molded form; providing a special receiver bottom which can be molded of soft materials, but which has channels of ample flow capacity defined by upstanding load-supporting ribs; providing an economical combination of receiver support structure formed of planar sheet metal portions and a molded body; providing a shallow depth, self-cleansing filter cell suited to be employed in an array of adjacent cells pivoted for discharge about axes lying perpendicular to the line of array, which permits close spacing of adjacent cells without their interfering in tilting, which maximizes the effective filter area of such an array; and providing a self-cleansing filter cell having a receiver bottom whose ribs directly support the filter medium with a minimum of masking, i.e., a minimum of dead area by blocking by the ribs.

Other objectives and advantages of the invention will appear hereinafter.

The present invention embodies the realization that the filtrate that passes through the horizontal filter medium after the initial surge can remove solids in the receiver where the receiver bottom comprises a multiplicity of adjacent, narrow, open grooves, each groove bottom sloping to a collector. By so channeling the flow, the liquid is not allowed to meander and by-pass the solids that have previously passed through the filter medium and deposited, so there is a scrubbing action upon them. The slope increases the speed of flow and decreases the force needed to move the solids along, so that the solids tend to roll and be carried down to the collector.

Preferably every portion of the filter medium is in substantially vertical communication with a groove. By this provision, filtrate passing through every part of the filter medium is positively channeled to flow directly to the collector at a substantial speed, and the flow works throughout to prevent solid deposits.

The combined effects of slope and channeling accomplish what neither effect alone can do, that of maintaining the filtrate receiver in a clean condition, even, for instance, with solids from iron concentrates having a specific gravity as high as 4.5.

In contrast, the prior art receivers which have broad flow paths, whether sloped or horizontal, allow filtrate en route to the collector to meander around solid deposits without any substantial scrubbing action. Also, in contrast, in prior art receivers which have horizontal bottom, uniform cross-section grooves, the portions of such grooves that are most remote from the outlet do not maintain rapid flow for transporting loose solids, nor for eroding solids which have deposited. Furthermore, they create detrimental variations in flow rates from one point to another in the filter medium.

The self-cleansing concept of this invention can be employed in numerous filter arrangements employing expanses of horizontal filter media, such as in scraping discharge type filters where the filter cake is scraped from the horizontal surface, as in the flighted scraper conveyor and scroll discharge filter arrangements and in the tilting cell type where the solids are discharged by inverting the cells. In scraping type cells the invention provides for the first time a rapid and efficient way to sweep out the filtrate and solids. In the case of tilting cells, the invention does away with special and inadequate final draining procedures before discharge of the solids and allows the cells to have a low profile which permits close spacing together of adjacent cells without interference in tilting.

The self-cleansing concept can be employed with filter constructions in which supporting wires hold the filter medium horizontally in a spaced-above relation to the receiver bottom and with false bottom supports that rest on the ribs of the receiver bottom. Additional advantages are obtained, however, by supporting the filter medium directly on crests of the closely spaced receiver ribs, with the ribs parallel at a spacing no greater than the length of filter medium which is self-supporting to extend substantially in a horizontal plane under load. In this way, wide areas of filter medium can be efficiently supported in a lightweight and inexpensive structure. By the ribs engaging the filter medium directly, it is possible to seal each groove with respect to one or both of the adjacent grooves to improve the action of pressure differential over the filter medium.

The above features can be provided in a novel mat member molded of corrosion resistant material, especially soft rubbery materials. Advantageously, the mat member employs a central elongated collector and a group of transverse grooves on each side. One such construction is provided with a flat bottom which is supported by a pan constructed of planar sheet metal.

The invention will be more fully understood with reference to the following detailed description taken in conjunction with the accompanying drawings of preferred embodiments of the invention:

Figure 1:
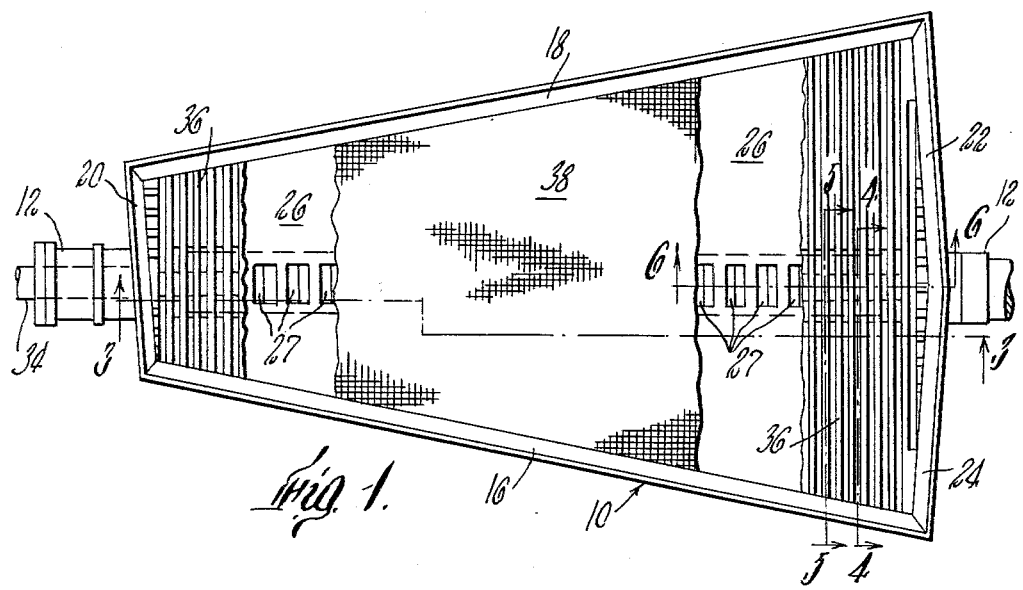
FIG. 1 is a plan view partly broken away, showing one embodiment of a filter cell according to the present invention.
Figure 2:
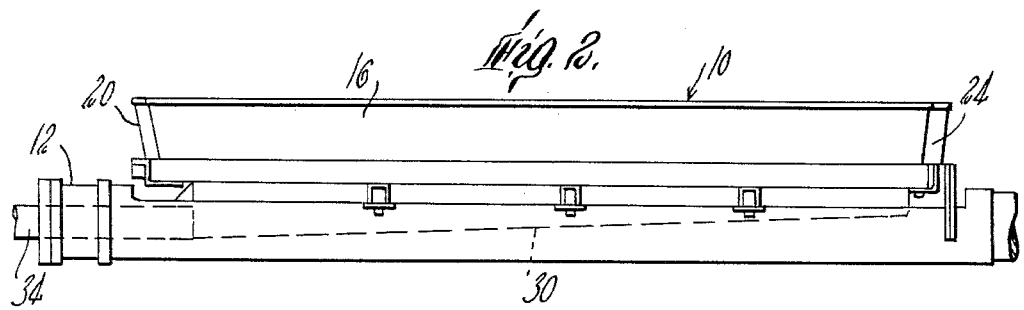
FIG. 2 is a side elevation view of FIG. 1.
Figure 3:
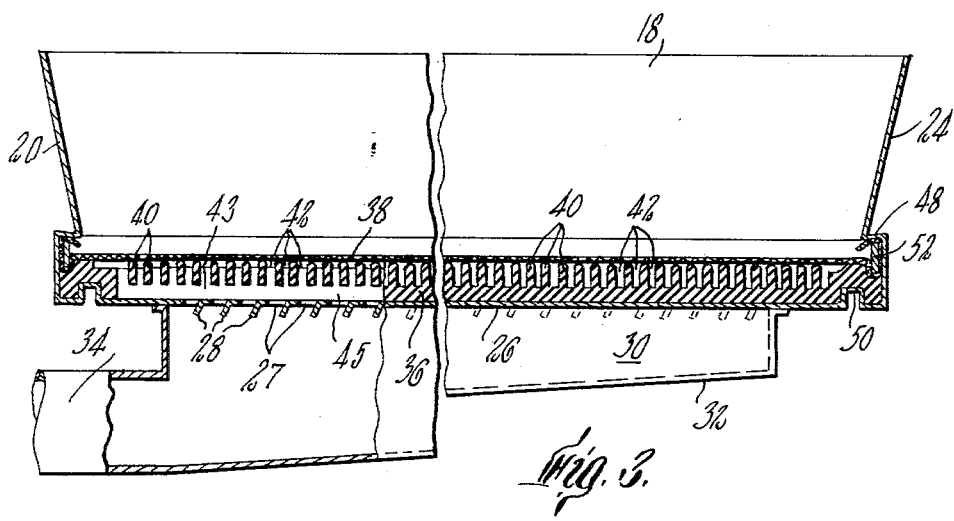
FIG. 3 is a longitudinal, vertical cross-section of the embodiment of FIG. 1 on a larger scale, taken on line 3—3.
Figure 10:
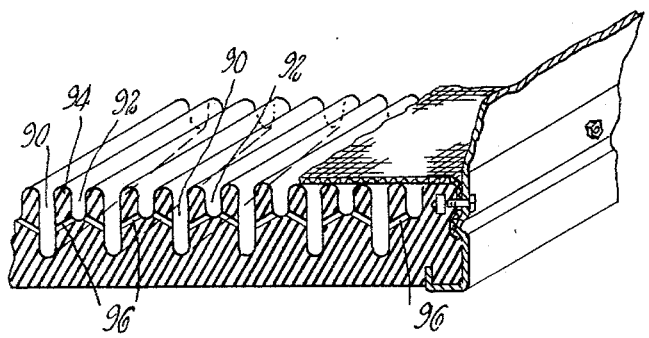
Figure 10A:
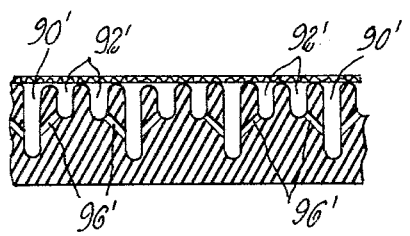
Figure 12:
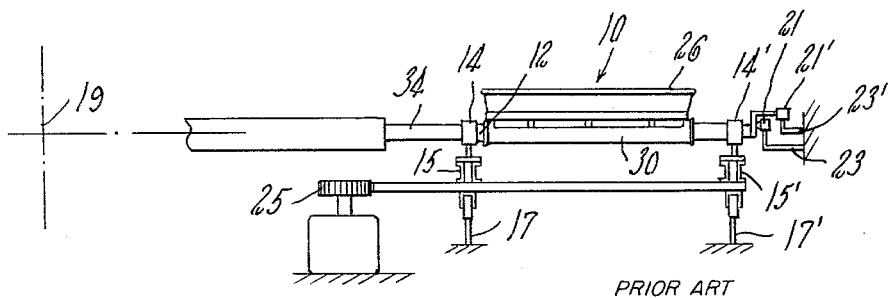
Figure 11:
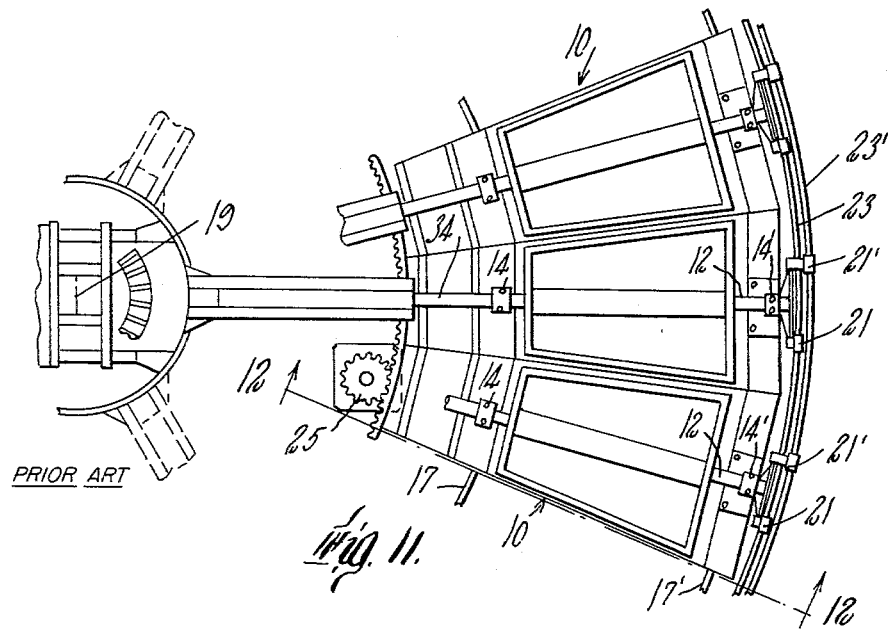
Figure 13:
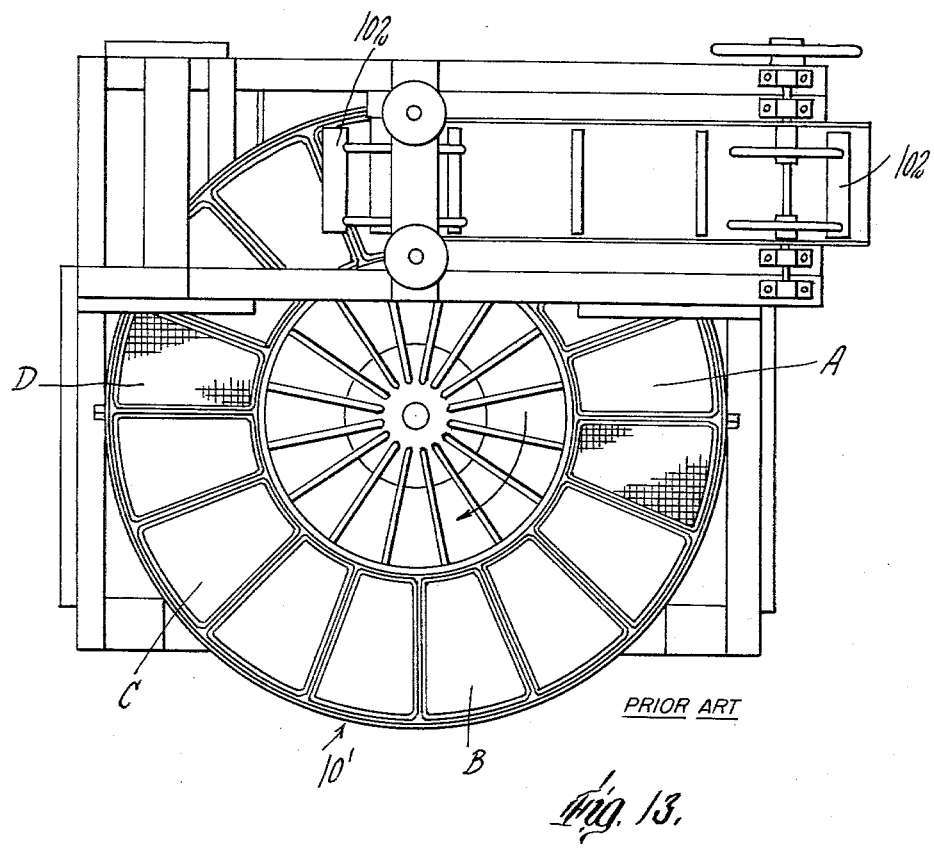

FIGS. 4 and 5 are vertical transverse cross-sections of FIG. 1, taken on lines 4—4 and 5—5 respectively, on a further enlarged scale;

FIG. 6 is a longitudinal vertical cross-section of the embodiment of FIG. 1 taken on line 6—6;

FIGS. 7 and 8 are longitudinal vertical cross-sections taken on lines 7—7 and 8—8 of FIG. 4, respectively;

FIG. 9 is a cross-sectional view similar to FIG. 3 of another embodiment of the invention, a unitary molded filter cell;

FIG. 10 is a perspective view, partly cut away, of an embodiment of a molded receiver particularly suitable for being made of soft rubbery materials;

FIG. 10a is a vertical cross-sectional view of another embodiment of a receiver suitable for being made of soft rubbery materials;

FIG. 11 is a partially broken away plan view of a rotary filter apparatus of the prior art pivoted cell type, employing cells of the invention;

FIG. 12 is a side cross-sectional view of the prior art filter apparatus of FIG. 11 taken on line 12—12;

FIG. 13 is a plan view of a rotary filter cell of the prior art scraper-conveyor type, employing cells of the invention.

Referring now to the embodiment of FIGS. 1–8 and FIGS. 11 and 12, individual filter cells 10 are mounted for tilting on shafts 12, the shaft ends being supported by bearing 14, 14' on concentric circular supports 15, 15' (FIG. 12) that are rotatably mounted on rails 17, 17' so that a circular array of cells can be rotated about a common vertical axis 19 by pinion 25. In the course of rotation each cell can be filled with slurry, filtrate can be drained through the filter medium, vacuum can be applied through drain piping 34 to the underside of the filter medium and for discharge cams 21 and 21' mounted on the cells and stationary cam tracks 23, 23' invert the cells.

Each filter cell includes a lightweight pan of isoceles trapezoidal configuration comprised of side plates 16 and 18, end plates 20, 22 and 24, and a horizontal cell bottom 26 of sheet metal. A series of openings 27 extends along the longitudinal center line by striking a series of transverse tabs 28 from the sheet metal bottom 26, the tabs inclined downwardly in the direction of flow. These tabs provide rigidity to the bottom. An elongated collector 30 is joined to the bottom 26 beneath the openings 27. Its bottom surface 32 inclines to vacuum drain piping 34. As an example, the filter cell pan may be 7 feet long, 5 feet wide at its widest, 2½ feet wide at its narrowest and the collector may be 3 inches wide, progressing from a 3-inch to a 7-inch depth.

A mat member 36 rests in the pan. It has a group of spaced-apart, upwardly directed, alternate, transverse ribs 40 and grooves 42 on each side of the longitudinal center line defining narrow drain channels. The crests of the ribs lie in a single horizontal plane to engage directly the filter medium sheet. The crests are rounded so only a narrow portion of each engages the filter medium and do not mask much of it. Preferably, the ribs are parallel and their crests are spaced apart a distance slightly less than the length of filter medium that is self-supporting under load in substantially a horizontal plane, and the ribs provide the sole support for the filter medium. The grooves 42 have downwardly sloping bottoms 42' in the direction of the openings 27 to the collector, the vertical cross-sectional area of the grooves increasing in that direction. The groove bottoms are rounded in cross-section to avoid solid-catching corners. Preferably, the grooves and ribs are each ¼ inch in thickness and the grooves define together a flow area substantially ½ of the horizontal area that would be defined if the filter bottom were flat.

Accordingly, every part of the filter medium is substantially directly above a narrow groove into which filtrate can flow and each groove has a vertical cross-section which increases as area of filter medium served by that cross-section increases. The increasing cross-section enables sufficient velocity of flow through every part of the filter medium under the effects of vacuum and gravity.

As described above, the channeling and sloping of the grooves makes the cell self-cleansing, causing solids to be scrubbed and washed out. The receiver also is self-cleansing with respect to removing the filtrate from the receiver because the filtrate passing through the filter medium purges the filtrate already residing there with the aid of gravity and pressure differential so that no filtrate is allowed to stagnate. Similarly, when the flow of filtrate through the filter medium ends, air passages through the filter medium and sweeps the filtrate down the sloped bottom grooves with the aid of gravity.

The receiver mat 36 is of moldable form with the ribs integral with base portions which define the groove bottoms. A central longitudinal rib 43 is joined to the middle ends of each group of transverse ribs 40, joining the two groups together. The groove bottoms 42' end at points spaced from the rib 43 providing exit openings for the filtrate. The lower side portions 45 of rib 43 are shaped to deflect the filtrate downwardly. The upper surface of rib 43 has transverse ribs and grooves for channeling filtrate. The bottom rib 43 is continuous and is engaged on the bottom of the pan, bridging the openings 27, so that flows from channels on opposite sides of rib 43 mingle only after being deflected downwardly.

The perimeter of the mat member is locked to the pan sides to prevent fall-out when the cell is inverted by ledges 48, projections 50 and caulking strip 52.

Where the mat is formed of resilient material, suction cup members 54 as shown in FIG. 5 can be molded into the bottom of the mat to secure the mat to the pan.

The specific structure just described, in which the two groups of transverse channels slope downwardly to a central longitudinal collector has a number of additional advantages: for a given cell area the relatively short flow paths made possible by such central collection permit the use of a relatively steep slope for the channel bottoms without adding undue depth to the cell; time for passage of filtrate from filter medium to and through the longitudinal collector is minimized, giving little time for the solids to settle from the filtrate; and the longitudinal collector is simple to accommodate in a molded mat structure.

Referring now to the embodiment of FIG. 9, this filter cell 80 is molded with self-supporting material which may be of rubber with interior steel supports or of resistant, structural, synthetic resins such as the epoxy or polyester families, suitably reinforced as by fiber. The transverse ribs 102, the bottom support structure 104 and the pan sides 106 are integral. The tabs 28' as shown are molded integral with the filter cell as shown or they can be formed from a metal sheet member which is inserted into the molded cell. Longitudinal braces (not shown) internal of the molded cell can simultaneously define the general form of the entry to the collector 30' and impart rigidity to the entire molded structure.

Referring to FIG. 10, here is shown a molded filter mat which is especially shaped to enable it to be made out of soft rubbery materials such as natural rubber, butyl rubber and neoprene of a durometer on the order of 60. It will be appreciated that soft rubbers do not have great structural rigidity, and when a mat is made of such soft materials according to the embodiments heretofore shown, the ribs fold over when the filter medium is subjected to vacuum and load which impairs the operation of the filter cell.

Referring to FIG. 10, the grooves are alternately deeper at 90 than would be employed in the groove of the designs discussed above and at 92 are shallower. This, in effect, produces two different columns each of which has a much greater resistance to folding over than the ribs in the preceding embodiments when formed of soft materials. The column 94 has the effective height of the narrow groove and the width of a single rib. This height is substantially less than that of the preceding designs. Even though the column does not appear to be slender, the low modulus of elasticity causes the slender column formula for elastic failure to govern. By that formula, the decrease in height of the column increases its resistance to folding over.

The second column is that which extends between two deep grooves. This has a very substantial thickness and therefore has adequate inherent lateral support to withstand the buckling tendency.

Therefore, this construction has the structural strength of the short column while having the hydraulic equivalent of the average of the shallow and deep grooves.

Referring to FIG. 10a, every third groove 90' is deeper than the two intervening grooves 92' according to the same principle and passages 96' connect each shallow groove with one deep groove.

It will be appreciated that a deep groove in the middle and a shallow groove on each side act as a set which is sealed from the adjacent sets. This improves the distribution of vacuum under the bottom of the filter medium. Similarly, if each groove 92 in FIG. 10 communicates only with one deep groove, sets of two grooves can be isolated. Where a support wire or the like rests on top the ribs, providing a lateral passage over the ribs, no passages 96, 96' are required.

The advantages of the embodiments of FIGS. 10 and 10a lie in the fact that these mats can be molded of soft materials, e.g. 60 durometer, under very little mold pressure, e.g. 200 p.s.i., and there are many acid resistant materials which are available in the 60 durometer range. In contrast, with harder materials extremely high molding pressures are required, e.g. 900 p.s.i., and above, and there are relatively few materials from which to choose in the design of a mat.

Referring to FIG. 13, there is shown a rotary filter apparatus in which a multiplicity of horizontal filter cells 10', or receiving elements each having a multiplicity of narrow, sloped bottom channels as set forth above are arrayed in a circle about a vertical axis. In this instance the filter medium is in effect continuous throughout the circle of array, there being no radial separating walls above the level of the filter medium. The cells do not tilt, but the entire filter medium remains horizontal throughout the filtering cycle. A slurry is applied to them at a position designated by letter A in the figure. The filtrate is drained through the filter medium as the cell moves to position B at which time wash water is added, which is drained to C. From C to D air is drawn through the solids on top of the filter medium. Then a scraper conveyor 102 scrapes the solids off of the filter media as the cells rotate. It will be appreciated that in such a design, the filter constructions described above offer particular advantages as regards self-cleansing and simplicity.

Various modifications of the specific details shown can be made within the spirit and scope of the invention.

What is claimed is:

1. A filter receiver for supporting a sheet-form filter medium and channeling the flow to an outlet, the receiver having a multiplicity of alternate parallel ribs and grooves, the grooves being narrow to channel the flow, the crests of the ribs being substantially aligned to resist the forces applied to the filter medium, some of said grooves being deeper than other of said grooves to form a plurality of deep and shallow grooves, each of said deep grooves having a shallow groove on each side thereof, each rib lying between a shallow and a deep groove being molded of soft elastomeric material, and receiving lateral support due to the material defining the bottom of said shallow groove, restraining said rib from bending under load.

2. The filter receiver of claim 1 wherein spaced apart passages through the respective ribs communicate between said shallow and deep grooves through which liquid in said shallow grooves flows into said deep grooves.

3. The filter receiver of claim 1 wherein said ribs and grooves are integral parts of a molded member, said member molded of soft elastomeric material.

4. A filtering apparatus of the type for filtering slurries comprising an expanse of filter medium, a receiver means supporting said filter medium horizontally in upwardly exposed manner, said receiver means located below said filter medium in gravity communication therewith, outlet opening means for withdrawing liquid from said receiver means, solids cake removal means for removing solids cake from said filter medium, and means for moving at least said filter medium and said receiver means from a slurry charging position to said solids cake removal means while liquid filters through said filter medium, and thereafter returning said filter medium and said receiver means to said slurry charging position to complete a filtering and solids cake removal cycle, wherein said receiver means is constructed and arranged to channel said liquid toward said outlet opening means, said receiver means having a multiplicity of alternate parallel ribs and grooves the grooves being narrow to channel the flow, the crests of the ribs being substantially aligned to resist the forces applied to the filter medium, some of said grooves being deeper than other of said grooves to form a plurality of deep and shallow grooves, each of said deep grooves having a shallow groove on each side thereof, each rib lying between a shallow and a deep groove being molded of soft elastomeric material, and receiving lateral support due to the material defining the bottom of said shallow groove, restraining said rib from bending under load.

5. A filtering apparatus of the type for filtering slurries comprising an expanse of filter medium, a receiver means supporting said filter medium horizontally in upwardly exposed manner, said receiver means located below said filter medium in gravity communication therewith, outlet opening means for withdrawing liquid from said receiver means, solids cake removal means for removing solids cake from said filter medium, and means for moving at least said filter medium and said receiver means from a slurry charging position to said solids cake removal means while liquid filters through said filter medium, and thereafter returning said filter medium and said receiver means to said slurry charging position to complete a filtering and solids cake removal cycle, wherein said receiver means is constructed and arranged to channel said liquid toward said outlet opening means, said receiver means having a multiplicity of alternate parallel ribs and grooves, the grooves being narrow to channel the flow, the crests of the ribs being substantially aligned to resist the forces applied to the filter medium, some of said grooves being deeper than other of said grooves to form a plurality of deep and shallow grooves, each of said deep grooves having a shallow groove on each side thereof, each rib lying between a shallow and a deep groove being molded of soft elastomeric material, and receiving lateral support due to the material defining the bottom of said shallow groove, restraining said rib from bending under load, spaced apart passages extending through the respective ribs, communicating between said shallow and deep grooves, through which liquid in said shallow grooves flows into said deep grooves, the bottoms of at least said deep grooves sloping downwardly toward said outlet opening.

6. A filtering apparatus of the type for filtering slurries comprising an expanse of filter medium, a receiver means supporting said filter medium horizontally in upwardly exposed manner, said receiver means located below said filter medium in gravity communication therewith, outlet opening means for withdrawing liquid from said receiver means, solids cake removal means for removing solids cake from said filter medium, and means for moving at least said filter medium and said receiver means from a slurry charging position to said solids cake removal means while liquid filters through said filter medium, and thereafter returning said filter medium and said receiver means to said slurry charging position to complete a filtering and solids cake removal cycle, wherein said receiver means is constructed and arranged to channel said liquid toward said outlet opening means, said receiver means having a multiplicity of alternate parallel ribs and grooves, the grooves being narrow to channel the flow, the crests of the ribs being substantially aligned to resist the forces applied to the filter medium, some of said grooves being deeper than other of said grooves to form a plurality of deep and shallow grooves, each of said deep grooves having a shallow groove on each side thereof, each rib lying between a shallow and a deep groove being molded of soft elastomeric material, and receiving lateral support due to the material defining the bottom of said shallow groove, restraining said rib from bending under load, said ribs and grooves of said receiver means comprising intergral parts of a molded member, said member molded of soft elastomeric material.

References Cited by the Examiner

UNITED STATES PATENTS

| | | | |
|---|---|---|---|
| Re. 24,150 | 5/56 | Delruelle | 210—395 X |
| 947,856 | 2/10 | Sellenscheidt | 210—231 |
| 1,335,695 | 3/20 | Oliver | 210—395 X |
| 2,224,191 | 12/40 | Lose | 210—107 |
| 2,444,147 | 6/48 | Walton | 210—486 |
| 2,637,443 | 5/53 | Schwartz | 210—328 |
| 3,039,611 | 6/62 | Sandmann | 210—482 X |
| 3,105,817 | 10/63 | Seibert | 210—406 X |

FOREIGN PATENTS 587,642  11/33  Germany.

REUBEN FRIEDMAN, *Primary Examiner.*

HERBERT L. MARTIN, *Examiner.*